United States Patent
Nair et al.

(10) Patent No.: US 7,389,404 B2
(45) Date of Patent: Jun. 17, 2008

(54) APPARATUS AND METHOD FOR MATRIX DATA PROCESSING

(75) Inventors: Gopalan Nair, Phoenix, AZ (US); Archana Sekhar, Kerala (IN); Prasanth David, Kerala (IN); Antony Jose, Kerala (IN)

(73) Assignee: G4 Matrix Technologies, LLC, Phonenix, AZ (US)

( * ) Notice: Subject to any disclaimer, the term of this patent is extended or adjusted under 35 U.S.C. 154(b) by 246 days.

(21) Appl. No.: 11/224,875

(22) Filed: Sep. 12, 2005

(65) Prior Publication Data

US 2006/0101245 A1    May 11, 2006

Related U.S. Application Data

(63) Continuation-in-part of application No. 10/315,700, filed on Dec. 9, 2002, now Pat. No. 6,944,747.

(51) Int. Cl.
    *G06F 15/00* (2006.01)

(52) U.S. Cl. .......................................... 712/35; 712/220
(58) Field of Classification Search ................. 712/220, 712/35
    See application file for complete search history.

(56) References Cited

U.S. PATENT DOCUMENTS 4,507,726 A * 3/1985 Grinberg et al. .............. 712/11

* cited by examiner

*Primary Examiner*—Eddie Chan
*Assistant Examiner*—John Lindlof
(74) *Attorney, Agent, or Firm*—Wright Law Group, PLLC; Mark F. Wright

(57) ABSTRACT

A matrix data processor is implemented wherein data elements are stored in physical registers and mapped to logical registers. After being stored in the logical registers, the data elements are then treated as matrix elements. By using a series of variable matrix parameters to define the size and location of the various matrix source and destination elements, as well as the operation(s) to be performed on the matrices, the performance of digital signal processing operations can be significantly enhanced.

20 Claims, 6 Drawing Sheets

APPARATUS AND METHOD FOR MATRIX DATA PROCESSING

RELATED APPLICATION

This application is a continuation-in-part of U.S. patent application Ser. No. 10/315,700 filed on Dec. 9, 2002, now issued as U.S. Pat. No. 6,944,747, which patent is incorporated herein by reference.

BACKGROUND OF THE INVENTION

1. Technical Field

The present invention relates generally to digital signal processing and more particularly to relatively high-speed signal processing for various applications, such as communications.

2. Background Art

Signal processing may be described as the mathematical manipulation of signals in a predetermined manner to enhance, modify or otherwise alter the signal, typically to prepare the signal for additional post-processing applications. The input signals are often "sampled" data elements taken from various forms of analog signals such as voice, video, and various communication sources. After sampling, these analog signals may be processed by a variety of electronic systems to accomplish the desired results. Additionally, input signals may be originally presented as digital signals and many signal-processing environments provide signal processing capabilities for analog as well as digital signals.

Approximately 30 years ago, with certain advances in technology, digital signal processing applications started to proliferate. This momentum was fueled, in part, by the rapid growth of digital electronics, including the emergence of semiconductor-based transistors and microprocessors. Prior to the advent of relatively inexpensive digital signal processing hardware, signal processing was mostly accomplished with analog components, implemented as a series of filters such as high pass filters, low pass filters, band pass filters and the like. Presently, digital signal processing is used extensively in applications such as cellular telephones, video capture and enhancement, high-speed data modems and the like.

While many modem microprocessors used in typical digital signal processing applications today can handle data elements with a relatively large number of representative bits (e.g., 32, 64, and 128 bits), most of the sampled analog signals processed by these microprocessors have a much smaller representative data resolution (e.g., 4, 8 or 16 bits). This disparity in the size of the data representations results in wasted processor bandwidth and other processing inefficiencies. For example, if 8 bit data elements are loaded into 16-bit or 32-bit registers, the remaining register bits may remain unutilized. This inefficient use of available storage results in resource underutilization, which generally leads to increased signal processing times. In general, this inefficient processing can lead to "data-starvation" for the microprocessor, and the microprocessor consumes precious cycle time and energy waiting for data to arrive instead of processing data.

Accordingly, in an attempt to take advantage of the capabilities offered by the processors available in the industry today, various techniques such as "packed data types" have been implemented to improve data utilization in the field of digital signal processing. This involves storing multiple data elements in a single register. For example, a single 32-bit register might be loaded with four 8-bit data elements. This technique, while successfully utilizing the available storage space, requires relatively complex indexing algorithms to effect data retrieval and manipulation. Additionally, the data elements are often still retrieved from the 32-bit register as discrete 8-bit elements, requiring multiple machine cycles to retrieve the data for processing.

Alternatively and/or in addition to more efficient data storage techniques, some digital signal processing systems have increased the speed of the data bus in an attempt to provide the smaller data elements to the microprocessor at higher frequencies, thereby speeding the overall processor operations. However, even after implementing these various techniques, the microprocessors used in many digital signal-processing systems remain "data-starved" and underutilized. This situation is undesirable because the lack of timely data presentation can, in certain circumstances, add additional processing cycles and, correspondingly, slow down the overall operation of the devices utilizing the processed signal.

Additionally, in the case of certain applications such as processing error correction codes and enabling and implementing encryption protocols for on-line data transfer, the manipulation of the data can be based on complex polynomial operations, leading to significant processing overhead. This type of data processing can consume precious processor cycles, thereby slowing down the overall response time of the system and delaying further processing until the data can be processes and formatted for use in the desired application. Since most data processors are not optimized for polynomial operations, the loss of processing power can be significant.

As shown by the discussion presented herein, the current constraints on data utilization in the area of digital signal processing have prevented additional improvements in the rapidly accelerating pace of various signal-processing applications. Accordingly, unless further improvements and enhancements are made in the apparatus and methods used in storing and manipulating data elements, the capabilities of digital signal processing systems will remain sub-optimal.

SUMMARY OF THE INVENTION

A matrix data processor is implemented wherein data elements are stored in physical registers and mapped to logical registers. The matrix data processor includes an arithmetic logic unit and a register set. The register set includes multiple configuration registers where each configuration register contains one or more matrix parameters that are configured to describe and identify a first source matrix, a second source matrix, and a destination matrix. After being stored in the logical registers, the data elements are then treated as matrix elements. By using the matrix parameters to define the size and location of the various matrix source and destination elements, as well as the operation(s) to be performed on the matrices, the performance of digital signal processing operations can be significantly enhanced. Additionally, the operand matrices can be used to represent polynomial coefficients, thereby enabling rapid processing of polynomial operations and the implementation of operations in alternate number systems including Galois Fields.

BRIEF DESCRIPTION OF DRAWINGS

The preferred embodiments of the present invention will hereinafter be described in conjunction with the appended drawings, wherein like designations denote like elements, and:

FIG. 3 is a block diagram of a register set in a matrix data processor in accordance with a preferred exemplary embodiment of the present invention;

FIG. 8 is a block diagram of an expanded configuration register for a matrix data processor in accordance with a preferred exemplary embodiment of the present invention; and FIG. 9 is a block diagram of an expanded configuration register for a matrix data processor in accordance with an alternative preferred exemplary embodiment of the present invention.

DETAILED DESCRIPTION

The matrix data processor of the present invention stores data elements in physical registers and maps the data elements to logical registers. The matrix data processor then performs data processing operations by treating the data elements in the logical registers as elements of matrices. By using a series of variables to define the size and location of the matrix elements, as well as the operation(s) to be performed on the matrix elements, the performance of digital signal processing operations can be significantly enhanced.

Figure 1:
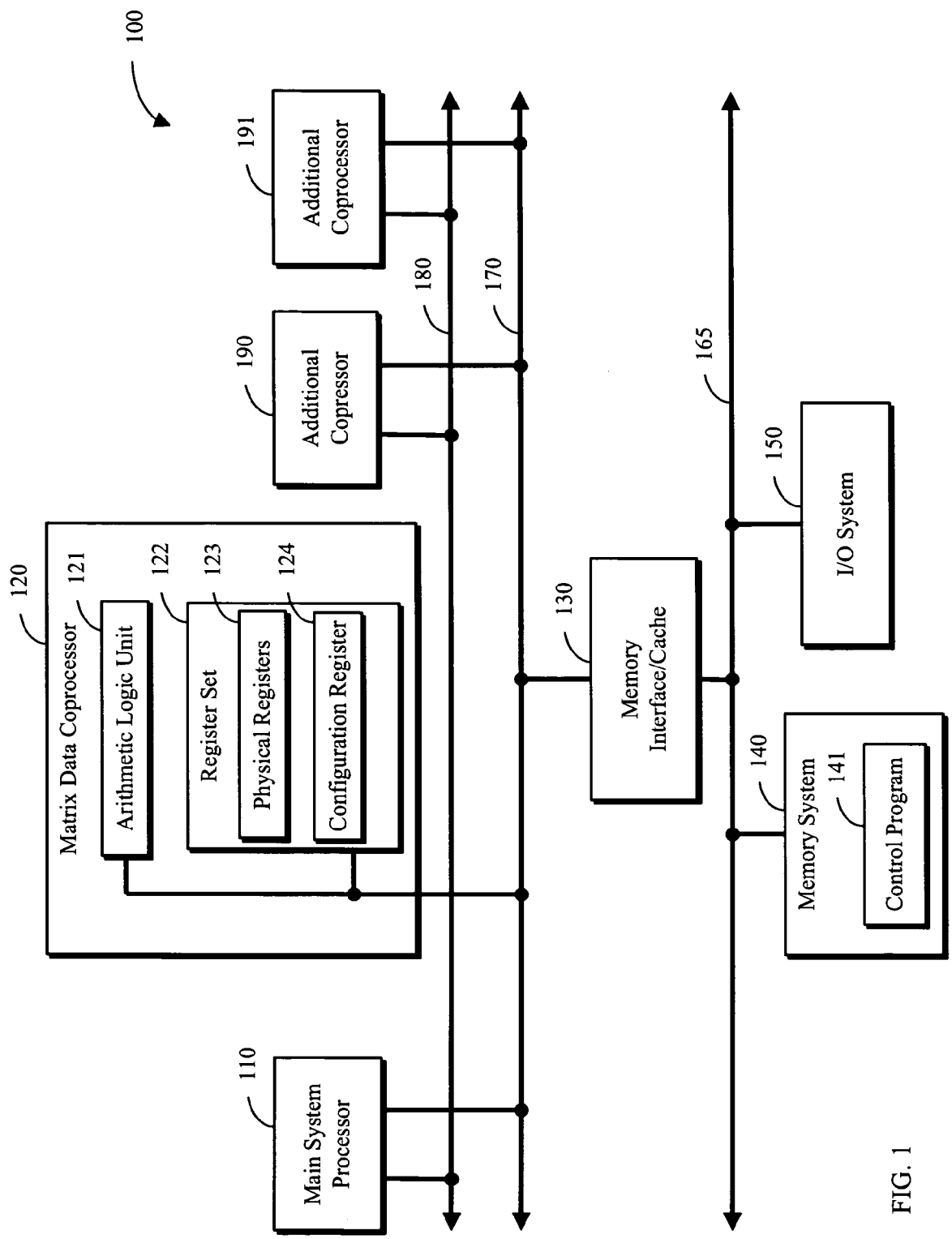
FIG. 1 is a block diagram of a matrix data processing system in accordance with a preferred exemplary embodiment of the present invention.

Referring now to FIG. 1, a matrix data processing system 100 in accordance with a preferred embodiment of the present invention comprises a main system processor 110, a matrix data processor 120, one or more optional coprocessors 190 and 191, a memory interface/cache 130, a memory system 140, and an I/O system 150. Main system processor 110, coprocessors 120, 190 and 191, and memory interface/cache 130 are coupled via a bus 170. Bus 170 provides a pathway for passing various types of information, such as data and instructions, between the various connected components.

Main system processor 110 and coprocessors 120, 190 and 191 are also coupled together by coprocessor bus 180. Coprocessor bus 180 communicates commands and various control signals between main system processor 110 and coprocessors 120, 190 and 191. Instructions fetched from memory system 140 are visible to main system processor 110 and coprocessors 120, 190, and 191. These instructions provide the necessary data and information for coprocessors 120, 190 and 191 to complete their assigned tasks. It should be noted that while matrix data processing system 100 incorporates two coprocessors, i.e., 190 and 191, matrix data processing system 100 may include any suitable number of coprocessors, depending on the specific application requirements. Similarly, memory interface cache 130 and memory system 140 and I/O system 150 are coupled together via memory bus 165. Memory bus 165 provides for communication between memory interface cache 130 and memory system 140 and I/O system 150.

Main system processor 110 may be any microprocessor suitable for use in a signal-processing environment. For example, the most preferred embodiments of the present invention may advantageously utilize an Advanced RISC Machines (ARM) processor offered by ARM Ltd. to perform the functions of main system microprocessor 110. Depending on the engineering and production specification for a given application, other microprocessors known to those skilled in the art may also be used and the present invention may be implemented using a wide variety of processors. The ARM architecture is depicted herein merely because the use of the ARM architecture incorporates a well-known coprocessor deployment methodology that is well understood by those skilled in the art.

Regardless of the specific processor chosen, main system processor 110 typically comprises an instruction sequencer and fetch unit that performs all operations related to fetching instructions from the appropriate memory location. Additionally, the functions of main system processor 110 will preferably include both address generation and the handling of the instruction bus.

In the most preferred embodiments of the present invention, matrix data processor 120 is a special function microprocessor designed specifically for digital signal processing applications. Additionally, matrix data processor 120 houses arithmetic logic unit 121 and a register set 122. Register set 122 most preferably includes a plurality of physical registers 123 and one or more configuration registers 124 that are used in storing and processing data in conjunction with matrix data processor 120. Additional detail about the functional operation of matrix data processor 120 is presented in conjunction with the discussion of FIGS. 2-7.

It should be noted that in the co-processor configuration, such as that depicted in FIG. 1, activities such as memory management, data caching, instruction decoding, processing of general purpose instructions, etc. are generally performed by main system processor 110. In some alternative preferred embodiments of the present invention, matrix data processor 120 is implemented as a stand-alone processor and the operational functions currently provided by main system processor 110, such as memory management, data caching, instruction decoding, etc. would be incorporated into the stand-alone processor.

While shown as discrete components, those skilled in the art will recognize that main system processor 110 and matrix co-processor 120 may be physically combined onto a single chip. Additionally, in at least one preferred embodiment of the present invention, the functionality of both main system processor 110 and matrix data co-processor 120 may be performed by a single microprocessor. The exemplary embodiment shown in FIG. 1 is intended to demonstrate the addition of matrix data processing capabilities to existing signal processing applications. Eventually, it will be possible to include the functions of matrix data co-processor into other architectures.

The various buses shown in FIG. 1 are provided to pass data and instructions between the various system components depicted in FIG. 1 and other components that are not included in FIG. 1. For example, after processing various data supplied from external memory system 140, matrix data processor 120 can output the results for transmission via data bus 180. In this fashion, post-processing activities may be implemented by other post-processing components. The data path or width of the various buses will be determined by the specific application. However, with the exception of co-processor bus 180, the buses are depicted generally as 32-bit buses. Co-processor bus 180 is represented as a 3-bit bus.

Additionally, while each of busses 165, 170, and 180 are shown as a single bus, various preferred embodiments may actually use multiple separate busses to accomplish the communication between the various components of matrix data processing system 100. Finally, it should be understood that, depending on the specific architecture and application requirements, the number and types of busses in a given matrix data processing system 100 may vary. The various buses shown in FIG. 1 are merely representative of any suitable communication link or communication mechanism, including a hardwired connection, an internal or external bus, including infrared or other wireless communications that can suitably perform the functions described herein.

Memory system 140 suitably contains at least some form of data to be processed and all or part of the object code for control program 141 that is used to control matrix data processing system 100. The control program is configured to receive an instruction and construct the first source matrix and the second source matrix. Additionally, the control program is configured to instruct ALU 121 to perform at least one matrix operation using the first and second source matrices as operands. The term "memory" as used herein refers to any storage location in the virtual memory space of matrix data processing system 100. It should be understood that memory system 140 may or may not be implemented as a monolithic memory structure. For example, portions of the control program may be loaded into an instruction cache (not shown) for processor 110 to execute, while other files may well be stored on direct access storage devices (DASD) such as magnetic or optical disk storage devices (not shown). In addition, it is to be understood that external memory system 140 may consist of multiple disparate memory locations.

I/O system 150 provides is representative of an interface to additional system components and the physical connections therefore. These additional system components may include video displays, DASD components, speakers, keyboards, printers and the like. By utilizing I/O system 150, data processed by matrix data processing system 100 may be communicated to other devices and systems, allowing for various post-processing options such as display or transmission of the processed data. Additionally, I/O system 150 may be used to provide data by to matrix data processing system 150 by utilizing external acquisition devices for sampling and importing analog data.

In operation, main system processor 110 manages the fetching and interpretation of the instructions stored in memory system 140. As required, main system processor 110 will communicate with memory interface 130 and request the appropriate instructions/data form memory system 140. These instructions and data are transmitted from memory system 140 to main system processor 110 via bus 170. Main system processor 110, coprocessors 120, 190, and 191 can each retrieve the information presented on bus 170 and will validate the instructions/data and interpret the instructions, executing any valid instructions as appropriate.

If a given instruction is intended for execution by main system processor 110, main system processor 110 will execute the instruction. In this specific exemplary embodiment of the present invention, the instructions for coprocessors 120, 190 and 191 are embedded within the main instruction stream. Accordingly, main system processor 110 will recognize those instructions that are intended for execution by coprocessors 120, 190 and 191. If, however, a given instruction is intended for execution by one of coprocessor 120, 190 or 191, main system processor 110 will signal the appropriate coprocessor.

In the case of instructions intended for matrix data coprocessor 120, matrix data coprocessor 120 will authenticate the instruction and respond to main system processor 110 when the instruction has been received and recognized. At the appropriate time, matrix data coprocessor will interpret and execute the instruction or instructions and then signal main system processor 110 that the instruction has been successfully executed. It should be noted that this is just one example of a typical "handshaking" process that is well known to those skilled in the art. Other handshake protocols may also be employed, as appropriate.

It should be noted that various modifications, additions, or deletions may be made to matrix data processing system 100 illustrated in FIG. 1 within the scope of the present invention such as the addition of other peripheral devices, including various direct access storage devices (DASD) such as hard disk drives and the like.

Figure 2:
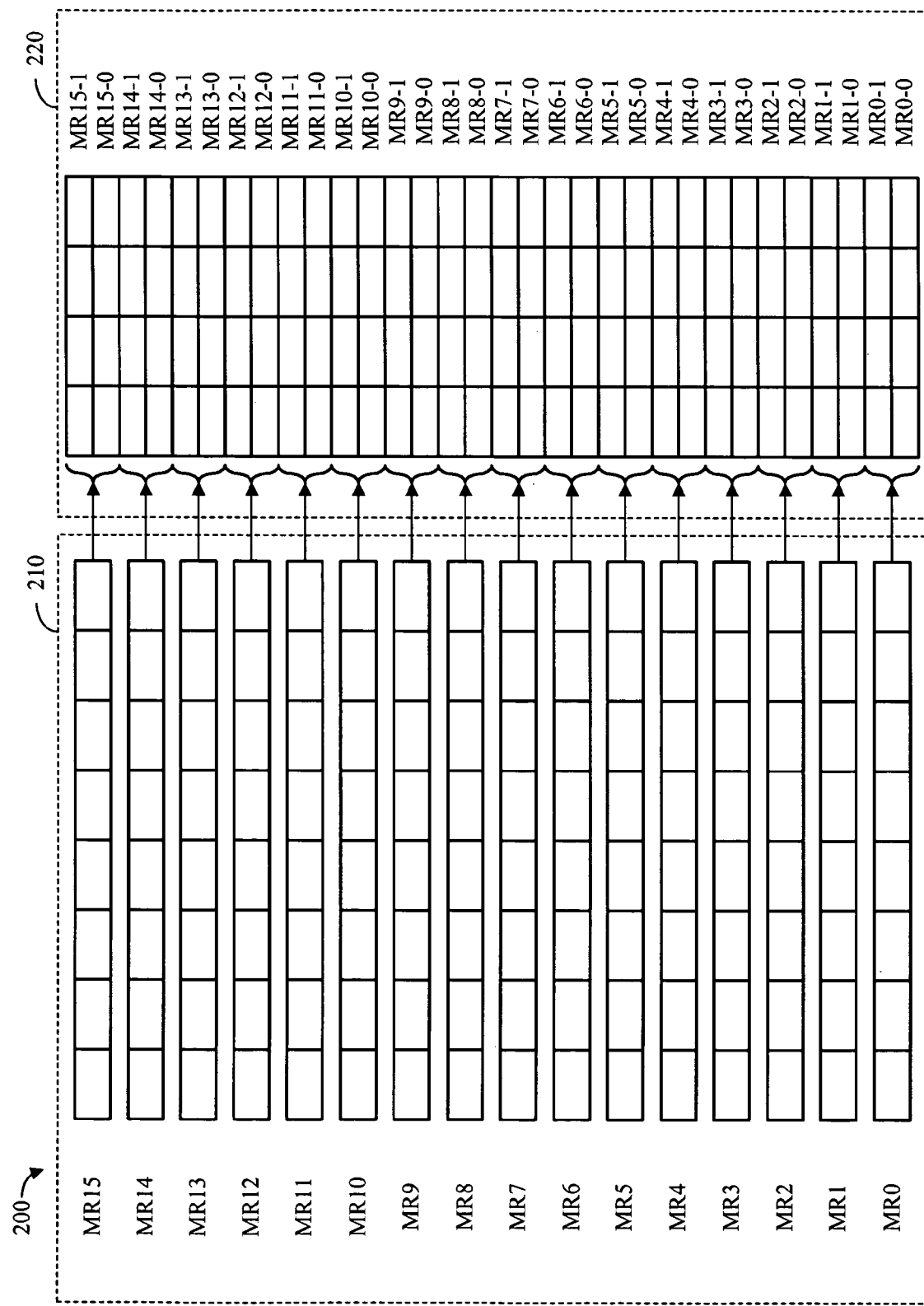
FIG. 2 is a block diagram of a register set in a matrix data processor in accordance with a preferred exemplary embodiment of the present invention.

Referring now to FIG. 2, a preferred embodiment for a register set 200 suitable for use with matrix data processor 120 of FIG. 1 comprises a logical register set 210 and a physical register set 220. In the most preferred embodiments of the present invention, logical register set 210 comprises a series of 16 registers, with each register in logical register set 210 comprising a 64-bit register. Correspondingly, in the most preferred embodiments of the present invention, physical register set 220 comprises a series of 32 registers, with each register in physical register set 220 comprising a 32-bit register. With this configuration, each 64-bit register in logical register set 210 is mapped to and represented by two 32-bit registers in physical register set 220. Logical register set 210 and a physical register set 220 are coupled to each other via an internal communication link.

Although specific sizes and numbers of registers have been identified herein for purposes of illustration, those skilled in the art will recognize that other sizes of registers may be incorporated and any suitable number of logical and physical registers may be incorporated into a matrix data processing system. The examples presented in FIG. 2 are merely illustrative of one specific configuration adapted for a specific application.

It should be noted that the most preferred embodiments of logical register set 210 include a status register and a control register, in addition to 14 general-purpose registers. Correspondingly, physical register set 220 comprises 2 status registers, 2 control registers, and 28 general-purpose registers. This configuration allows each logical 64-bit data element from logical register set 210 to be stored in two 32-bit locations in physical register set 220. Memory access, including loading and storing data elements, is controlled by microprocessor 110, shown in FIG. 1. In the most preferred embodiments of the present invention, various data elements are typically stored as packed data sets in physical register set 220 and then mapped to logical register set 210. Once mapped to logical register set 210, the various elements may be manipulated as matrix elements.

Matrix data processor 120 operates with matrices as the basic data type, with each of the elements of the matrix being identified from the packed data types contained in register set 200. Matrix data types can be any two-dimensional matrices of any size, limited only by the span of the register set 200. Accordingly, each element or component of each matrix may be any one of the following:

4-bit signed or unsigned number (nibble or N)
8-bit signed or unsigned number (byte or B)
16-bit signed or unsigned number (half-word or H)
32-bit signed or unsigned number (word or W)
64-bit signed or unsigned number (double-word or D)

The data elements are typically identified in the packed matrix data processor registers by using their indices, starting from an initial value of zero for the first element. The data elements are identified by their index in the packed data space. By using the indices as described in conjunction with FIGS. 4 and 5, data elements in register set 200 may be accessed as any of N, B, H, W or D data types. This flexibility in the creation of the individual matrix elements provides a relatively high amount of flexibility in the construction of matrices and, correspondingly, in the type of signal processing calculations that can be performed.

In the most preferred embodiments of the present invention, the packing of the data in register set 200 is always aligned to a power of 2, starting from bit 0 of each of the 64 bit registers. Accordingly, each of the 64 registers can contain 16, 8, 4, 2, or 1 of N, B, H, W or D data elements respectively. The packing is preferably done in such a manner so that none of the data elements would span the register boundaries. Other embodiments may use alternative data packing schemes and methodologies, depending on the specific requirements of a given application.

In traditional digital signal processors and other generic microprocessors, the operands are typically stored in registers or uniquely addressable memory locations. Even in the MMX architectures and the vector architectures used in relatively high performance computing, the operands are still registers or memory locations, or a contiguous set of registers or memory. The matrix data processor of the present invention introduces a novel methodology for handling data, by treating it as a data set that could be configured as matrices and vectors of a very flexible but mathematically structured format.

In the most preferred embodiments of the present invention, matrix data processor 120 utilizes a load/store architecture, in the sense that all the data processing (arithmetic and logical) operations are performed on the data elements stored in register set 200. There are separate instructions for transferring data between memory system 140 and register set 200. Similarly, there is a separate set of instruction for transferring data between the memory registers of main system processor 110 and register set 200. Even when performing the loading and storing operations to accomplish data exchange between register set 200 and memory system 140, the source and target information in matrix data processor 120 is structured as matrices, thus providing more flexibility to manipulate (e.g. pack/unpack complex numbers, etc.) of different data types.

In the most preferred embodiments of the present invention, matrix data processor 120 has at least three operand operations, similar in structure to a standard ARM instruction, with source matrix "$M_y$," operating on source matrix "$M_x$", with the result stored in destination matrix "$M_d$". Source matrices $M_x$ and $M_y$ are formed by an ordered arrangement of the packed data residing in register set 200. It should be noted that the matrix data elements are logical configurations for presenting a specific data structure to the arithmetic logic unit (ALU) 121, (contained within matrix data processor 120), and may not necessarily have any other physical relationship or significance in the context of computations performed by matrix data processor 120. Destination matrix $M_d$ is a designation for the matrix elements located in register set 200 where the results of the computations performed by ALU 121 contained in matrix data processor 120 may be stored.

In general microprocessor architectures and implementations, it is preferable to have each instruction remain as independent as possible from the earlier instructions, and as independent as possible from the current state (saved in the register file, status register, or otherwise) of the machine. One implication of this is a desire to be able to specify all of the operands required for processing any given instruction within the instruction stream proper, without having to resort to passing the information regarding instructions through multiple instructions. In the case of the present invention, this implies that the definitions of each of the three matrix operands (two sources and one destination) will be provided for each matrix operation as a part of the instruction stream for the specified matrix operation in order to deploy an optimal solution.

To be able to span a register file of sixteen 64 bit registers, with data elements packed as nibbles (4 bits), the indexing mechanism should most preferably have at least 8 bits available to reference any given location in the packed data set. In addition, the matrix reference should be able to describe and provide the matrix order (numbers of rows and columns) and also the intervals to be used between the rows and columns to logically construct the operand matrices.

Figures 4, 5, 6:
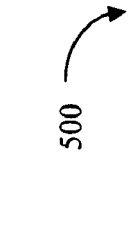
FIG. 4 is a block diagram of an 64-bit instruction for specifying a series of matrices for a matrix data processor in accordance with a preferred exemplary embodiment of the present invention.
FIG. 5 is a block diagram of a 32-bit instruction for specifying a series of matrices for a matrix data processor and a control register in accordance with a preferred exemplary embodiment of the present invention.
FIG. 6 is a block diagram of a configuration register for a matrix data processor in accordance with a preferred exemplary embodiment of the present invention.

Referring now to FIG. 4, one possible solution for specifying the matrix operation and the complete description for each of the matrix parameters used to identify and construct the matrices is shown. Each of the variable matrix parameters for identifying the elements of the respective matrices (i.e., number of rows and columns, element resolution) can be given sufficient resolution to cover the range of the operands that should be represented. It should be noted that the results or destination matrix $M_d$ does not require the same level of specification as the source matrices because the matrix order, element intervals and/or steps are implied as a result of the matrix operation performed using matrices $M_x$, and $M_y$. As shown in FIG. 4, providing the full specification in a single instruction can be achieved using an instruction word of 64 bits or more.

As the number of bits in the instruction become more limited, it becomes increasingly difficult to specify all desired matrix parameters to adequately identify the source and destination matrices. In fact, when the instruction word length available to matrix data processor 120 is limited to less than 32 bits, it becomes very difficult, if not impossible, to provide the full specifications directly in the instructions. In the example embodiment, the available bits for each of the instruction mapping as a coprocessor is only 19 bits in each instruction word, as the remaining 13 bits of the normal 32 bit ARM processor instruction word is utilized for other purposes. In most applications, this space is insufficient to fully specify the variable matrix parameters that comprise the matrices in the instruction itself. The most preferred embodiments of the present invention resolve this problem by:

Separating the matrix parameters in two separate groups based on the frequency of possible changes by the user;

Using one or more configuration registers 124 to store the less frequently changed parameters and selecting the desired configuration register 124 for the desired operation;

Using fewer bits of the instructions to specify the operand matrices; and

Generating the complete matrix description as a mathematical and logical combination of the information stored in one or more of the configuration registers 124 and the instruction, thereby generating the operand matrices to present to ALU 121.

Since frequently reconfiguring a single configuration matrix 124 may consume too many processing cycles, the most preferred embodiments of the present invention will include multiple pre-configured configuration registers 124, each with separate instructions to handle specific situations. In the case of multiple configuration registers 124, each of the configuration registers 124 may be independently programmatically pre-configured with the desired parameters and then programmatically selected based on the desired operation to be performed. These configuration or "shadow registers" may be configured and then selected in at least one of two different ways. For example a separate instruction may be issued to select the desired configuration register 124. In this case, an instruction in the form of MSETMC n may be implemented. In this example, when n=0:5, this instruction would define the configuration matrix 124 as MC0:MC5. This example requires the issuance of an additional instruction prior to executing the next instruction, thereby adding some processor overhead.

Alternatively, a specific bit in a given instruction may be used to designate or otherwise identify the desired configuration register 124 to be used in conjunction with that specific instruction. While this approach is arguably more powerful because it requires fewer processing cycles, it does require more bits to be used in the mapping configuration for executing the instructions. The most preferred embodiments of the present invention will include six separate configuration registers 124 but those skilled in the art will recognize that this number is not limiting as any number of configuration registers 124 may be deployed, depending on the specific application.

It should also be noted that the specific configuration bits shown in the exemplary embodiments have been selected for illustrative purposes only and many other arrangements for storing the necessary information in a configuration register are possible. Additionally, the various flags shown are not specifically used in matrix identification but generally to further quantify the specific type of mathematical operations to be performed on the matrix elements once identified.

Figure 3:
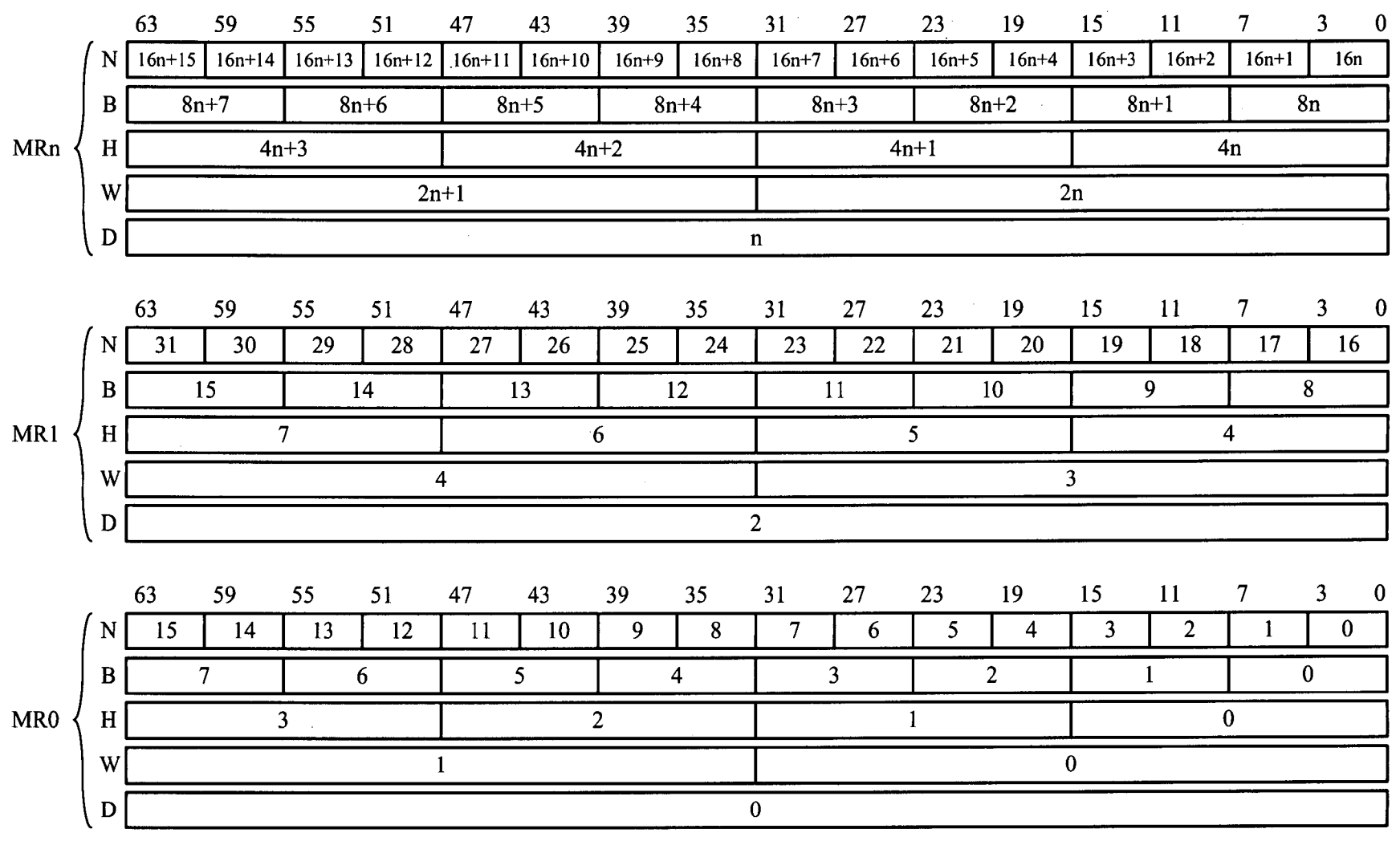

Referring now to FIG. 3, an indexing methodology 300 for use with a matrix data processor in accordance with a preferred exemplary embodiment of the present invention is shown. It should be noted that while indexing methodology 300 is shown as implementing a "little endian" indexing methodology, those skilled in the art will recognize that a corresponding "big endian" indexing methodology may be similarly employed.

A special group of instructions (LCW0 to LCW6) are provided to load the desired parameters to a configuration register, without disturbing the remaining values. The LCW0 instruction also permits simultaneous loading of all the matrix identification and configuration parameters in a configuration register (except S and F) to a desired initial default value. Alternately, the user has the option to move all 64 bits of a configuration register from an external memory location to the configuration register, using a memory load instruction.

In addition to the operand parameters specified in a configuration register, three bits each are typically assigned in each of the instructions to identify the $M_x$, $M_y$ and $M_d$ matrices, by their starting element indices. For purposes of illustration, these are termed $M_x\_offset$, $M_y\_offset$ and $M_d\_offset$, each with a parametric range of 0 to 7. Matrix data processor 120 then calculates the index of $M_x$ and $M_y$ as:

$$M_x\_index = M_x\_base + (offset\_scale)(M_x\_offset)$$

$$M_y\_index = M_y\_base + (offset\_scale)(M_y\_offset)$$

$$M_d\_index = M_d\_base + (offset\_scale)(M_d\_offset)$$

The use of an offset_scale parameter for the $M_x$ index, $M_y$ index and $M_d$ index computation permits a wider range of indices for the starting elements for each of the matrices. Additionally, it should be noted that the use of three bits to identify the starting or base element indices is merely illustrative and those skilled in the art will recognize other possible methods to accomplish the same task (i.e., using more bits to encompass a larger range).

Referring now to FIG. 4, a sample of a 64-bit instruction 400 for use in conjunction with a matrix data processor in accordance with a preferred embodiment of the present invention is shown. As shown in FIG. 4, instruction 400 contains a complete specification for identifying and executing a matrix operation using source matrix $M_x$ and a source matrix $M_y$ as its operands. The results of the matrix operation are stored in destination matrix $M_d$. Bits 56-63 are used to specify the instruction opcode, describing the specific matrix operation to be performed. Bits 48-55 specify the information necessary for storing the results of the specified matrix operation in destination matrix $M_d$. Similarly, bits 24-47 specify the information necessary for identifying the elements that are used to create source matrix $M_y$ and bits 0-23 specify the information necessary for identifying the elements that are used to create source matrix $M_x$.

In this exemplary embodiment, instruction 400 is essentially a "stand-alone" instruction that contains all necessary information for identifying the various source and destination matrices as well as the command specifying what matrix operation should be performed using the defined matrices. While this is the most preferred method for performing matrix operations from a theoretical standpoint, in practical application it requires the use of a relatively large instruction that may not be available in all cases. Accordingly, this may have a tendency to limit the backward compatibility of the invention with other, pre-existing architectures, including many digital signal-processing systems. Accordingly, an alternative preferred embodiment for identifying the desired matrix operation and the various source and destination matrices is to use a control register as described in conjunction with FIG. 5 and FIG. 6.

Referring now to FIG. 5, a sample instruction 500 for a system using a general-purpose microprocessor and a matrix data co-processor in accordance with a preferred exemplary embodiment of the present invention is depicted. As shown in FIG. 5, sample instruction 500 is a 32-bit instruction. It should be noted that since this example assumes a co-processor implementation, with a general-purpose microprocessor using a 32-bit instruction. Accordingly, sample instruction 500 uses a standard format for a typical ARM microprocessor. Other instruction formats may be adopted to achieve similar results with other microprocessor architectures. Additionally, it should be noted that the specific bit assignments are illustrative only and the identification of the matrix elements may be accomplished with alternative bit assignments.

When matrix data processor 120 is implemented as a coprocessor, coupled with a processor such as a 32-bit ARM V4 microprocessor, it is desirable to adhere to the standard instruction formats used by the microprocessor. While the full instruction set of the ARM microprocessor is available to complement the instructions used by matrix data processor 120 to operate on the dataset, the restrictions imposed by the ARM instruction mapping may make the specification of the individual matrix operands a bit cumbersome. Accordingly, certain indexing strategies may be advantageously employed to overcome any inherent limitations or deficiencies in the ARM instruction format.

In the typical ARM instruction set architecture, only 19 bits are available out of the 32 bits for the coprocessor data processing instructions. These 19 bits include the bits to be allocated for the opcodes of matrix data processor 120 (5 to 6 bits) as well as that for the desired matrix definition parameters. For full identification of each of the source matrices, matrix data processor 120 should most preferably be provided with the matrix size, indices for the respective matrix elements (i.e., $M_x$_index and $M_y$_index), and a manner of identifying the locations of the successive elements from the selected index. It should be noted that while the present example assumes a starting index, the matrices may be identified by indicating some other element of the matrices, such as the last element and then indexing into the matrices from the last element. The available 14 bits of the standard instruction map are generally insufficient to fully specify the three matrices (source1, source2, and destination), while still maintaining the flexibility that is desired in the data manipulation process.

In processors with relatively large instruction data widths, this may not be a problem. However, in the case of applications where matrix data processor 120 is employed as a coprocessor, the issue of efficient and effective specification of the matrix elements may be advantageously resolved by allocating one of the 16 registers in matrix data processor 120 for configuration purposes. Such a matrix configuration register is shown and explained in conjunction with FIG. 6. With a configuration register, at least a portion of the matrix element identification information is contained in the instruction and at least another portion of the matrix element identification information is contained in the configuration register. This approach allows certain preferred embodiments of matrix data processor 120 to be used in conjunction with general-purpose microprocessors that utilize less than a 64-bit instruction.

Referring now to FIG. 6, a sample bit assignment for a matrix configuration register or control register 600 in accordance with a preferred exemplary embodiment of the present invention is depicted. By utilizing control register 600, certain matrix identifying elements can be stored in control register 600, thereby removing them from the instruction stream. Control register 600 most preferably contains that information is modified less frequently. This specific implementation uses a combination of the information contained in control register 600 and the information contained in a typical 32-bit instruction to identify the matrix operation and the elements that comprise the source and destination matrices. By adopting this methodology, the present invention can be deployed in conjunction with most existing general-purpose microprocessors.

As shown in FIG. 6, control register 600 is most preferably a 64-bit register. Those skilled in the art will recognize that similar results could be accomplished with two 32-bit registers and other, similar register configurations.

Given the data contained in control register 600 and the information in a given instruction, the source matrices may be identified and formed using the following parameters:

The resolution of the elements for each of the matrices is provided as part of the instruction opcode. This information allows parsing of the register set to identify the elements of the matrices with their indices.

The order of each of the matrices, x_rows, x_cols, y_rows and y_cols. These are row and column parameters.

The index for the starting element of each of the matrices, $M_x$_index and $M_y$_index. These are provided as a combination of parameters provided in the control register 600 and the specific instruction.

The interval between corresponding elements of the successive rows of the matrices and the intervals between corresponding elements of successive columns. This parameter is stored in control register 600.

In certain applications, the formation and structure for storing the results of the matrix operation in the destination matrix are slightly different, due to the fact that the size and configuration of the destination matrix are not typically subject to independent control, other than the specification of element resolution and the starting index. Thus, for the destination matrix:

The number of rows and columns are typically determined by the specific operation that produces the destination matrix, in accordance with standard matrix arithmetic calculations Element resolution of the destination matrix data is most preferably specified in the instruction mnemonic It should be noted at this point that the parameters for row and column interval may have little meaning since the matrix is already formed, as a result of the matrix operation performed by matrix data processor 120. Accordingly, the results may need only to be saved at the referenced location for the destination matrix as specified in the configuration register. However, in certain applications, the destination matrix will also be fully specified, as are the original source matrices. In these applications, the destination matrix may be specified by the starting value for the location of the destination matrix and the appropriate row and column steps. The number of rows and columns for the destination matrix would be determined by the result of the specific arithmetic operation and as defined by the source matrix parameters.

In certain preferred embodiments of the present invention, "column unrolling" may be implemented to describe the destination matrix. In column unrolling, the successive column elements of the destination matrix are stored in successive packed data locations (cells) in the register, beginning with the index of the starting element. As in the case of the two source matrices, the destination start element is also identified as a parametric combination of information supplied through a configuration register and/or through the instruction parameters supplied in the instruction received from main system processor 110. Thus during destination matrix storage, assuming a methodology employing the starting element for each matrix, the implied assumptions are:

The starting index is calculated from parameters, and the first element (1,1) is placed at this location;

The elements of the first column are placed in successive locations in register;

The elements of $2^{nd}$ and following columns are placed in successive locations, until all the data are written;

This implies that if matrix $M_d$ were to be recreated for a subsequent matrix operation, using $M_d$ serving as a source register, the parameters for the corresponding source register would most preferably be:

Number of rows and columns as that of $M_d$, to be estimated and used as parameter;

Starting index as specified for $M_d$;

Interval between rows=1, as the matrix is stored by column unrolling;

Successive elements of the matrix are stored in successive locations. Interval between column elements=number of rows.

While useful for certain applications, column unrolling is only one method to be used for storing the result matrix to a set of packed register locations. Other methods of data packing and unpacking known to those skilled in the art may also be used in other embodiments. For example, in certain preferred embodiments of the present invention, the destination matrix may be specified in the same manner as the source matrices. By using the "row_step" and "column_step"

parameters to specify the destination matrix as well as the source matrices, greater flexibility can be obtained, thereby allowing for more rapid inclusion of the contents of the destination matrix as an intermediate result in subsequent arithmetic operations.

Examples of specific matrix arithmetic operations are shown in Table 1 below. For this example, there are nine different arithmetic operations, represented by mnemonics, each of which is capable of supporting either signed or unsigned arithmetic, resulting in a total of 18 arithmetic instruction mnemonics. The unsigned operation has an extension of 'U' to the instruction mnemonic; the default operation without the 'U' modifier is signed. In some situations, the results of the various arithmetic operations may be accumulated in the destination matrix by adding the results of the operation to the existing values previously stored in the destination matrix.

In addition to the illustrative arithmetic operations described in Table 1, basic bit-wise logical operations including bit shifting, logical AND/NAND/OR/NOR/XOR and similar logical operations known to those skilled in the art may also be performed on the various matrix elements. In this embodiment, the logical operations are generally performed on corresponding elements of the two source matrices and the results will typically be stored in the destination matrix. In some cases, e.g. a bit-wise complement operation, there may actually be only two operand matrices with the results from the operation on a source matrix being stored in a destination matrix. Samples of the various types of logical operations used in conjunction with a preferred embodiment of the present invention are depicted in Table 2 below. It should be noted that the sample arithmetic and logical operations depicted in Tables 1 and 2 are merely illustrative of the types of operations that may be performed and are not to be considered exhaustive.

In general, for the most preferred embodiments of the present invention, a three-bit field positioned in the instruction provides instruction modifiers for the resolutions of the elements for both the source and the destination matrices. The various preferred embodiments of the present invention implementation may or may not support different resolutions for the two different source matrices, depending on the specific application. The resolution modifiers are specified in the instruction mnemonic, following the conditional execution statement based on a typical ARM instruction format. The first and second resolution modifiers successively represent the destination and source matrices.

TABLE 1

| Mnemonic | Operation | Action |
| --- | --- | --- |
| MMUL | Matrix Multiply | $\{d_{i,j}\} \Leftarrow \left\{\sum_n y_{i,n} * x_{n,j}\right\}$ |
| MMULR | Matrix Multiply-Reverse | $\{d_{i,j}\} \Leftarrow \left\{\sum_n x_{i,n} * y_{n,j}\right\}$ |
| MMAC | Matrix Multiply-accumulate | $\{d_{i,j}\} \Leftarrow \left\{d_{i,j} + \sum_n y_{i,n} * x_{n,j}\right\}$ |
| MMACR | Matrix Multiply-accumulate Reverse | $\{d_{i,j}\} \Leftarrow \left\{d_{i,j} + \sum_n x_{i,n} * y_{n,j}\right\}$ |

TABLE 1-continued

| Mnemonic | Operation | Action |
| --- | --- | --- |
| MADD | Matrix Addition | $\{d_{i,j}\} \Leftarrow \{y_{i,j} + x_{i,j}\}$ |
| MSUB | Matrix Subtraction | $\{d_{i,j}\} \Leftarrow \{y_{i,j} - x_{i,j}\}$ |
| MSUBR | Matrix Subtraction - Reverse | $\{d_{i,j}\} \Leftarrow \{x_{i,j} - y_{i,j}\}$ |
| MMLE | Element by element Multiply | $\{d_{i,j}\} \Leftarrow \{y_{i,j} * x_{i,j}\}$ |
| MMCE | Element by element Multiply - Accumulate | $\{d_{i,j}\} \Leftarrow \{d_{i,j} + y_{i,j} * x_{i,j}\}$ |

TABLE 2

| Mnemonic | Operation | Action |
| --- | --- | --- |
| MSHRA | Shift Right – Arithmetic | $\{d_{i,j}\} \Leftarrow \{y_{i,j} >> x_{i,j}\}$ |
| MSHRAR | Shift Right – Arithmetic – Reverse | $\{d_{i,j}\} \Leftarrow \{x_{i,j} >> y_{i,j}\}$ |
| MSHR | Shift Right – Logical | $\{d_{i,j}\} \Leftarrow \{y_{i,j} >> x_{i,j}\}$ |
| MSHRR | Shift Right – Logical – Reverse | $\{d_{i,j}\} \Leftarrow \{x_{i,j} >> y_{i,j}\}$ |
| MSHL | Shift Left – Logical | $\{d_{i,j}\} \Leftarrow \{y_{i,j} << x_{i,j}\}$ |
| MSHLR | Shift Left – Logical Reverse | $\{d_{i,j}\} \Leftarrow \{x_{i,j} << y_{i,j}\}$ |
| MAND | Matrix Logical AND | $\{d_{i,j}\} \Leftarrow \{y_{i,j} < and > x_{i,j}\}$ |
| MANDN | Matrix Logical NAND | $\{d_{i,j}\} \Leftarrow \{y_{i,j} < nand > x_{i,j}\}$ |
| MOR | Matrix Logical OR | $\{d_{i,j}\} \Leftarrow \{y_{i,j} < or > x_{i,j}\}$ |
| MXOR | Matrix Logical Exclusive OR | $\{d_{i,j}\} \Leftarrow \{y_{i,j} < xor > x_{i,j}\}$ |
| MNOTX | Matrix Logical complement | $\{d_{i,j}\} \Leftarrow \{< NOT > x_{i,j}\}$ |
| MNOTY | Matrix Logical complement | $\{d_{i,j}\} \Leftarrow \{< NOT > y_{i,j}\}$ |

Figure 7:
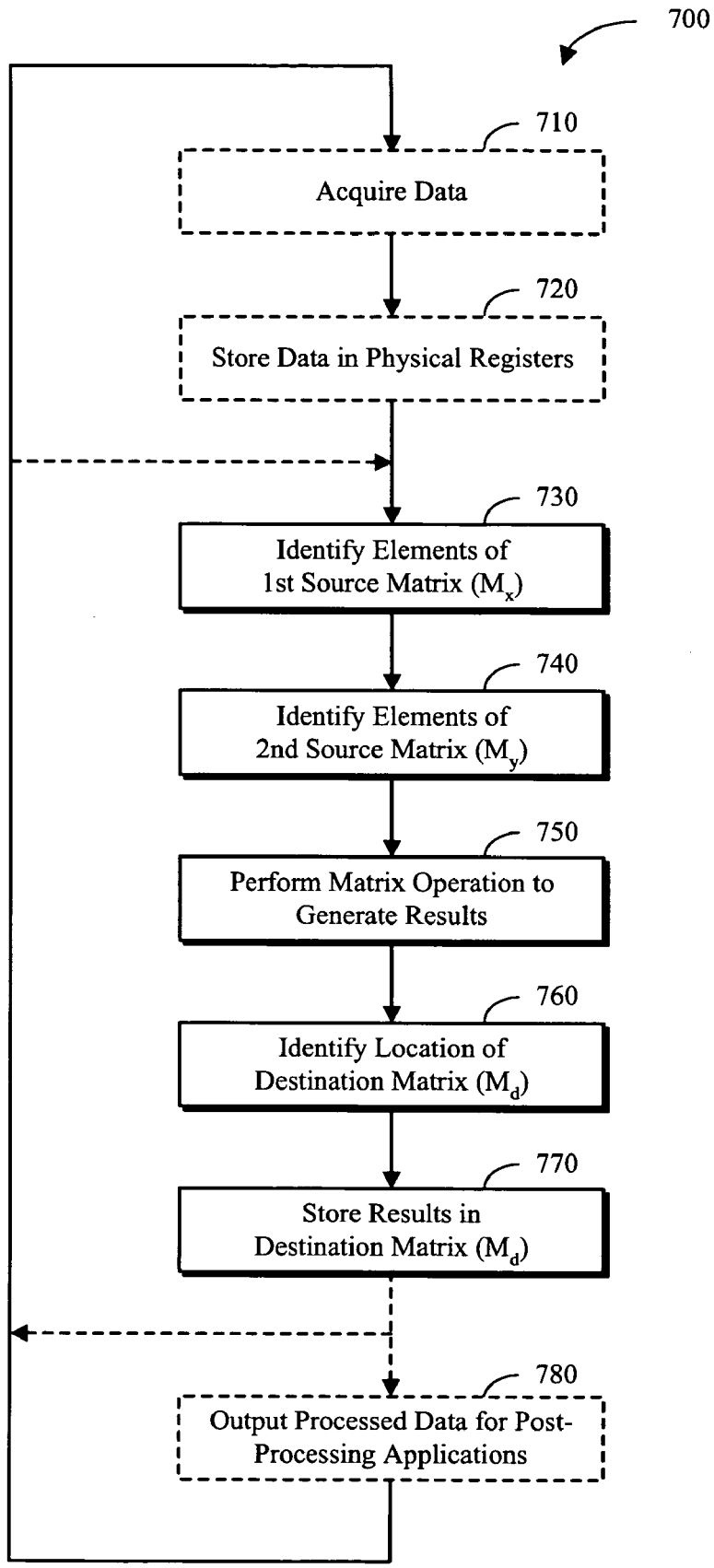
FIG. 7 is a flow chart of a matrix data processing method in accordance with a preferred exemplary embodiment of the present invention.

Referring now to FIG. 7, a matrix data processing method 700 in accordance with a preferred exemplary embodiment of the present invention is shown. Method 700 may begin with a data acquisition step (step 710) to acquire the data for processing. If necessary or desired, data may be acquired from multiple sources as part of performing step 710. Further, any analog data acquired in step 710 may be converted to digital data if necessary and this conversion process is considered part of step 710. The specific process employed for converting analog data to digital data is not described herein and any suitable methodology known to those skilled in the art may be adopted.

Next, the acquired data is stored in physical registers that are associated with the matrix data processing co-processor and associated with the desired logical register set as defined for the matrix data processing co-processor (step 720). It should be noted that steps 710 and 720 are considered optional steps and are performed only if new data is desired or necessary for a desired matrix data processing operation.

After the data has been acquired and stored in the appropriate registers, the elements that comprise the first source matrix can be identified for processing (step 730). This step typically involves indexing into the physical register set and identifying a matrix with the appropriate parameters to designate the size of each matrix element, the number of rows in the matrix and the number of columns in the matrix. As previously described, in the most preferred embodiments of the present invention, at least a portion of the identifying information for the elements that comprise the source and destination matrices may be contained in the instruction stream provided by the microprocessor. In this specific embodiment, a combination of data from the instruction stream and from a configuration register is used to provide the necessary matrix identification parameters.

Alternatively, the identifying information for the elements, size, and location of the various matrices may be stored in one or more configuration registers that may be preloaded with the appropriate configurations for the desired operations. In yet another preferred embodiment of the present invention, the identifying information for the elements, size, and location of each matrix is completely and specifically identified solely by the information contained in the instruction. This implementation is appropriate for those processors with a large enough instruction space to adequately represent the requisite matrix identification information. Similarly, the second source matrix can be identified for processing (step 740).

After correctly identifying the source matrices, the desired matrix operation(s) can be performed (step 750). It should be noted that any type of matrix operation known to those skilled in the art may be performed using the source matrices. This includes addition, subtraction, multiplication, etc. Additionally, it should also be noted that the present invention also contemplates the use of pre-determined standard matrices such as an identity matrix, transpose matrix, "F," matrix, etc. as one of the source matrices, thereby providing the capability to quickly perform most standard elementary matrix operations. These standard matrices may be permanently located in the memory space of the system or loaded from an external memory source as needed. Additionally, it should be noted that the source and destination matrices may overlap, with some data being stored in one location but being referenced more than once. This provides for additional flexibility in performing matrix operations and also conserves physical storage space by eliminating redundant data storage.

After performing the matrix operation, the location of destination matrix $M_d$ can be determined by using the identifying information contained in the instruction word and the configuration register (step 760). Once the appropriate storage location has been identified, the results from the matrix operation can be stored in the destination matrix $M_d$ (step 770).

As shown by the arrows in FIG. 7, the matrix data processing method of the present invention provides an opportunity for repetitive acquisition and processing of data prior to the eventual step of outputting the processed data for post-processing use (step 780). It should be noted that post-processing is a desired activity but may not be necessary after every matrix operation as the initial results stored in a given destination matrix may be an intermediate processing step and, accordingly, may become the source matrix for a subsequent operation.

Those skilled in the art will recognize that the matrix data processing environment of the present invention is unique in several aspects. Significantly, the matrix data processing system of the present invention identifies computational operands as matrices, with matrix elements packed in the register set of the processor. The specific matrix elements are identified and operated on as matrix elements, not as scalar elements. However, this does not foreclose the use of scalar elements since scalar elements can be readily implemented as a special case of matrix operations.

Additionally, in the most preferred embodiments of the present invention, the identifying information for the source and destination matrices are contained in the instruction stream or, alternatively, in a configuration register that is preloaded with the appropriate configurations. This feature allows for infinite variations in the size of the matrices (i.e., size of matrix rows and columns).

In addition to real number system and the binary number system, the most preferred embodiments of the present invention provide for performing arithmetic operations on additional number systems. For example, arithmetic operations over the Galois field are used extensively for error control coding where the addition and multiplication operations of the elements are defined over a new field of numbers closed under addition and multiplication.

The Galois field (GF(2^n) defines a generating polynomial that completely describes the addition and multiplication operations, similar to the addition and multiplication operations in the real number system. Each element can be represented by a nibble, byte, half-word, word or double word as with other number system representations. Additionally, all of the matrix multiplication and element-by-element multiplication operations are still valid in the newly defined number field. A Galois field may also be described as a finite field with $p^n$ elements where p is a prime integer. The set of non-zero elements of the Galois field is a cyclic group under multiplication. A generator of this cyclic group is called a primitive element of the field. The Galois field can be generated as the set of polynomials with coefficients in Z_p modulo, an irreducible polynomial of degree n.

The mathematical operation mode is passed on to the processor through a set of configuration parameters defined in the enhanced configuration register or, alternatively, through a pre-determined bit pattern in the instruction. Other natural extensions of the alternate number fields include a decimal number system with a range of 0-9 that is closed under addition and multiplication. This is also known as the "modulo 10" arithmetic operation.

The number field to be supported for a given instruction may be defined in the configuration register associated with the instruction or passed into the matrix data processor as part of the instruction. Whether extracted from the configuration register or from the instruction, the matrix data processor of the present invention interprets these parameters to determine the specific type of operations to be performed on the data.

In the most preferred embodiments of the present invention, the extended matrix configuration register will be used to pass a specific parameter describing the number system to be used for the processing of the data and the desired matrix operations and will include the ability to process and manipulate polynomials. The use of polynomials and the Galois field for error control coding can be found in references such as "*Error Control Coding. Second Edition,*" by Shu Lin and Daniel J. Costello, which reference is available from www.amazon.com as well as other sources.

Most of the common error control coding operations are performed on highly structured data configured as a set of polynomials, with the coefficients of the polynomials located in ordered locations in the memory space and/or internal register space. Each of the rows or columns of the matrices representing the polynomials are treated as the coefficients of the increasing order in the polynomial. For a first source matrix ($M_x$) A1, row elements are treated as the increasing order coefficients of polynomial with an order of 3:

$$\{a_{ij}\} = \begin{bmatrix} a_{00} & a_{01} & a_{02} & a_{03} \\ a_{10} & a_{11} & a_{12} & a_{13} \\ a_{20} & a_{21} & a_{22} & a_{23} \\ a_{300} & a_{31} & a_{32} & a_{33} \end{bmatrix} = \begin{bmatrix} a_{00} + a_{01}x + a_{02}x^2 + a_{03}x^3 \\ a_{10} + a_{11}x + a_{12}x^2 + a_{13}x^3 \\ a_{20} + a_{21}x + a_{22}x^2 + a_{23}x^3 \\ a_{30} + a_{31}x + a_{32}x^2 + a_{33}x^3 \end{bmatrix} = \begin{bmatrix} a_0(x) \\ a_1(x) \\ a_2(x) \\ a_3(x) \end{bmatrix}$$

Similarly, for a second source matrix $M_y$ B1 column elements are treated as the increasing order of coefficients of the polynomial with an order of 3:

$$\{b_{ij}\} = \begin{bmatrix} b_{00} & b_{01} & b_{02} & b_{03} \\ b_{10} & b_{11} & b_{12} & b_{13} \\ b_{20} & b_{21} & b_{22} & b_{23} \\ b_{30} & b_{31} & b_{32} & b_{33} \end{bmatrix} = \text{Transpose}\left(\begin{bmatrix} b_{00} + b_{10}x + b_{20}x^2 + b_{30}x^3 \\ b_{01} + b_{11}x + b_{21}x^2 + b_{31}x^3 \\ b_{02} + b_{12}x + b_{22}x^2 + b_{32}x^3 \\ b_{02} + b_{12}x + b_{22}x^2 + b_{32}x^3 \end{bmatrix}\right) =$$

$$[\, b_0(x) \quad b_1(x) \quad b_2(x) \quad b_3(x)\,]$$

The operation of matrix multiplication Mx*My is defined as the product of the polynomials represented by the row vector of the first source matrix and the column vectors of the second source matrix. The resultant matrix will have a different dimension than the source matrices as shown in the equation below:

$$\begin{bmatrix} a_0(x) \\ a_1(x) \\ a_2(x) \\ a_3(x) \end{bmatrix}_{m \times n} * [\, b_0(x) \quad b_1(x) \quad b_2(x) \quad b_3(x)\,]_{n \times p} = \begin{bmatrix} a_0(x) * b_0(x) \\ a_1(x) * b_1(x) \\ a_2(x) * b_2(x) \\ a_3(x) * b_3(x) \end{bmatrix}_{m \times 2n}$$

Given the ability of the matrix data processor to manipulate polynomials, it is important to determine a favorable methodology for representing the polynomials in memory and for passing the desired parameters to the matrix data processor so that the desired matrix operations can be performed.

Figures 8, 9:
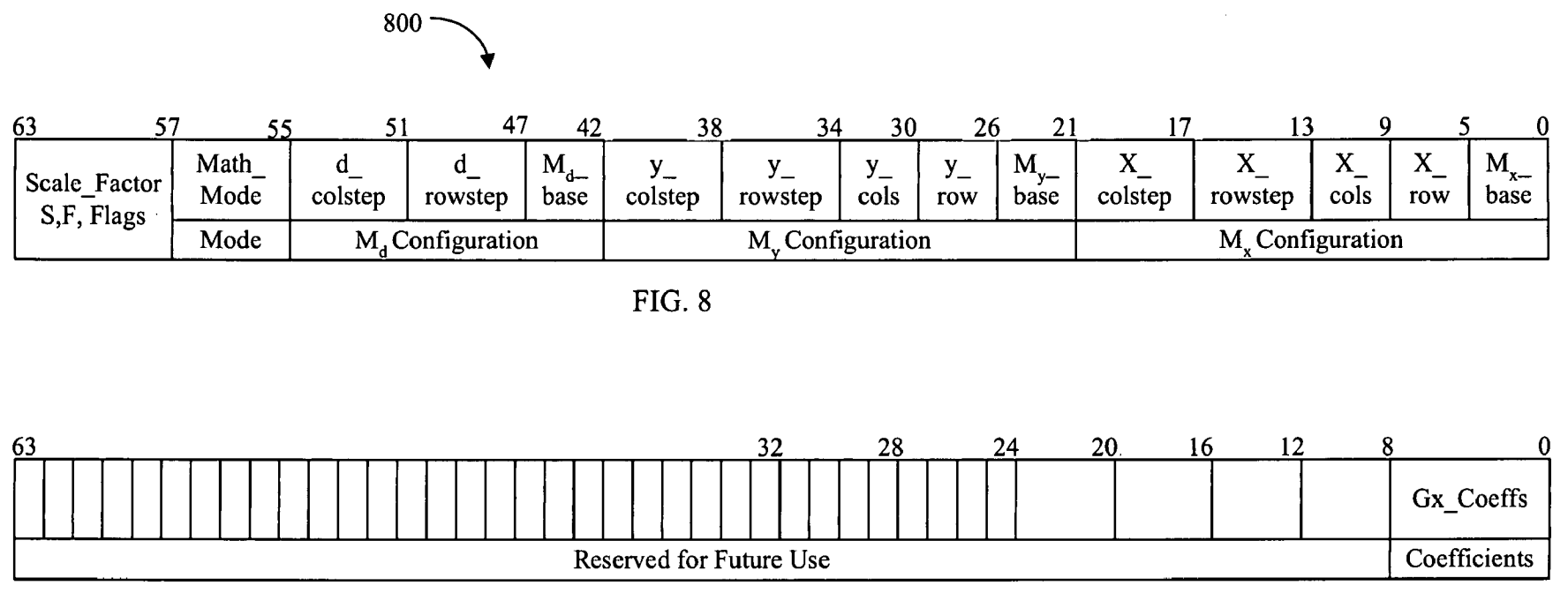

Referring now to FIG. 9, an extended matrix configuration register in accordance with a preferred embodiment of the present invention is shown. As seen in FIG. 9, the low order bits (0-7) can be used to represent the order and composition of the polynomial. Given that the manipulation of polynomials with a matrix data processor in accordance with the preferred embodiments of the present invention is considered to be a high value capability, the representation of polynomials for use with the present invention can be accomplished as shown below in Table 3.

TABLE 3

| BIT PATTERN | POLYNOMIAL |
|---|---|
| 0 0 0 0 1 0 1 1 | $X^3 + X + 1$ |
| 1 1 1 1 1 1 1 1 | $X^7 + X^6 + X^5 + X^4 + X^3 + X^2 + X + 1$ |

As seen in Table 3 above, an eight-bit binary number in the matrix configuration register of FIG. 9 can be used to represent a polynomial for matrix processing in accordance with a preferred embodiment of the present invention. Each bit represents one element of the resultant polynomial where a "0" bit represents a missing element and a "1" bit represents an element that should be present in the resultant polynomial. The least significant bit in the eight-bit binary number represents the rightmost element of the resultant polynomial (i.e., lower power of the variable X) and the most significant bit in the eight-bit binary number represents the leftmost element of the resultant polynomial (i.e., the highest power of the variable X).

Accordingly, as shown with the first entry in Table 3 above, with a bit pattern of 00001011, the first four elements of the resultant polynomial and the sixth element of the resultant polynomial (moving from the most significant bit to the least significant bit) are not present, yielding a polynomial equation of the form $X^3+X+1$. Similarly, the second example in Table 3 above yields a polynomial equation of the form $X^7+X^6+X^5+X^4+X^3+X^2+X +1$ for the bit pattern "11111111." In this fashion, a large number of different polynomials can be represented by a single eight-bit binary number, thereby yielding significant savings in the amount of memory needed to represent the desired polynomials. Those skilled in the art will recognize that the eight-bit configuration depicted in FIG. 9 is not limiting and other bit configurations are possible. The eight-bit representation will be sufficient for most operations, however, the remaining bits 8-63, may be used to convey information for larger or more complex polynomials and/or for additional processing data that may be useful in various applications.

From the foregoing description, it should be appreciated that apparatus and methods for a matrix data processor are provided and present significant benefits that would be apparent to one skilled in the art. Furthermore, while multiple embodiments have been presented in the foregoing description, it should be appreciated that a vast number of variations in the embodiments exist. For example, while illustrated as a stand-alone ARM-based co-processor, it will be understood by those skilled in the art that the functions and operational characteristics of the matrix data processor may be suitably incorporated into a CPU core, such as the ARM series of CPUs offered by ARM Ltd. Additionally, those skilled in the art will recognize that many other microprocessor architectures and models may be suitably deployed to practice the matrix data processing functions described herein.

Lastly, it should be appreciated that the illustrated embodiments are preferred exemplary embodiments only, and are not intended to limit the scope, applicability, or configuration of the invention in any way. Rather, the foregoing detailed description provides those skilled in the art with a convenient road map for implementing a preferred exemplary embodiment of the invention. Accordingly, it should be understood that various changes may be made in the function and arrangement of elements described in the exemplary preferred embodiments without departing from the spirit and scope of the invention as set forth in the appended claims.

The invention claimed is:

1. A matrix data processor comprising:
    an arithmetic logic unit;
    a register set coupled to said arithmetic logic unit, said register set comprising:
        a physical register set;
        at least a first configuration register, said at least a first configuration register comprising a first plurality of matrix configuration parameters; and
        at least a second configuration register, said at least a second configuration register comprising a second plurality of matrix configuration parameters;
    a memory coupled to said arithmetic logic unit and to said register set; and
    a control program residing in said memory, said control program being configured to receive an instruction and, based on said instruction, select one of said at least a first configuration register and said at least a second configuration register, along with the corresponding plurality of matrix configuration parameters, said control program being configured to construct a first logical two-dimensional source matrix and a second logical two-dimensional source matrix using said instruction and said first or second plurality of matrix configuration parameters, said control program being configured to instruct said arithmetic logic unit to perform at least one matrix operation using said first and second logical two-dimensional source matrices as operands.

2. The matrix data processor of claim 1 wherein each of said first configuration register and said second configuration register are configured to store a plurality of matrix parameters, said matrix parameters being used in conjunction with said instruction to identify and define said first and second logical two-dimensional source matrices and to also identify and define a destination matrix.

3. The matrix data processor of claim 1 wherein said arithmetic operation is a matrix multiplication operation.

4. The matrix data processor of claim 1 wherein said control program is configured to store a result from said matrix operation in at least one destination matrix.

5. The matrix data processor of claim 1 wherein at least one of said operands is a polynomial.

6. The matrix data processor of claim 5 wherein said at least a first configuration register comprises an eight-bit binary number, said eight-bit binary number representing said polynomial.

7. The matrix data processor of claim 1 wherein both of operands are polynomials.

8. The matrix data processor of claim 7 wherein each of said at least a first configuration register and said at least a second configuration register comprise an eight-bit binary number, said eight-bit binary numbers representing said polynomials.

9. The matrix data processor of claim 1 wherein said matrix data processor is configured to perform matrix operations other than matrix arithmetic and logical operations for other than the real number system.

10. The matrix data processor of claim 9 wherein said matrix data processor is configured to perform polynomial operations defined in a Galois field.

11. The matrix data processor of claim 1 comprising a total of six configuration registers, each of said six configuration registers comprising a plurality of matrix configuration parameters, each of said six configuration registers being configured to represent a polynomial using an eight-bit binary number.

12. A system for mathematical manipulation of polynomials, said system comprising:
a general purpose microprocessor; and
a matrix data processor coupled to said general purpose microprocessor, said matrix data processor comprising:
an arithmetic logic unit; and
a register set, said register set comprising at least one configuration register, said configuration register containing a plurality of matrix parameters for at least partially describing and identifying a first logical source matrix, said first logical source matrix representing a first polynomial, a second logical source matrix, said second logical source matrix representing a second polynomial, and a destination matrix, said destination matrix being configured to store the results of a matrix multiplication operation performed using said first polynomial and said second polynomial.

13. The system of claim 12 further comprising:
a memory coupled to said matrix data processor; and
a control program residing in said memory, said control program being configured to respond to an instruction and use said instruction and said plurality of matrix parameters contained in said at least one configuration register to construct said first logical source matrix and said second logical source matrix and instruct said arithmetic logic unit to perform said matrix multiplication operation using said first logical source matrix and said second logical source matrix as operands, and wherein said control program is configured to store a result from said matrix multiplication operation in said destination matrix.

14. The system of claim 12 further comprising an input/output system coupled to said general purpose microprocessor.

15. A computer-implemented method of processing data, said method comprising the steps of:
loading a register set contained within a computer memory with data;
receiving at least one instruction from a microprocessor, said at least one instruction comprising a plurality of matrix parameters, said at least one instruction defining at least one matrix multiplication operation;
parsing said data and said plurality of matrix parameters to construct a first logical matrix;
parsing said data and said plurality of matrix parameters to construct a second logical matrix;
performing said at least one matrix multiplication operation using said first logical matrix and said second logical matrix, thereby generating a result; and
storing said result in a destination matrix, said destination matrix being defined by said plurality of matrix parameters.

16. The method of claim 15 wherein said step of parsing said data and said plurality of matrix parameters to construct a first logical matrix comprises the step of locating an eight-bit binary number in said plurality of matrix parameters, said eight-bit binary number identifying the coefficients for a first polynomial.

17. The method of claim 15 wherein said step of parsing said data and said plurality of matrix parameters to construct a second logical matrix comprises the step of locating an eight-bit binary number in said plurality of matrix parameters, said eight-bit binary number identifying the coefficients for a second polynomial.

18. The method of claim 15 wherein said step of loading a register set with data further comprises the step of loading at least one configuration register, said at least one configuration register being configured to at least partially describe and define said first logical matrix, said second logical matrix and said destination matrix.

19. The method of claim 15 wherein said step of loading a register set with data comprises the step of loading six configuration registers, each of said six configuration registers being configured to at least partially describe and define a first logical matrix, a second logical matrix and a destination matrix.

20. The method of claim 15 wherein said step of performing said at least one matrix multiplication operation using said first logical matrix and said second logical matrix, thereby generating a result is performed by a matrix data coprocessor coupled to a general purpose microprocessor.

* * * * *